Dec. 26, 1967     B. C. ROEMER     3,359,673
ICE FISHING TIP-UP WITH LIGHT AND BUZZER
Filed Aug. 6, 1965
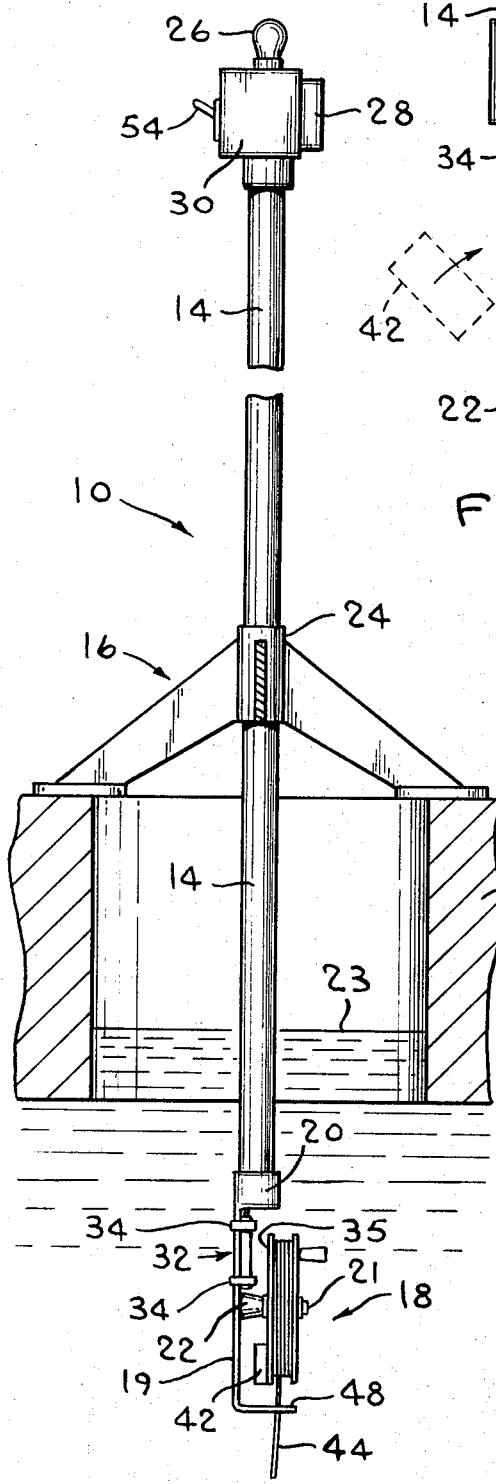
FIG. 1
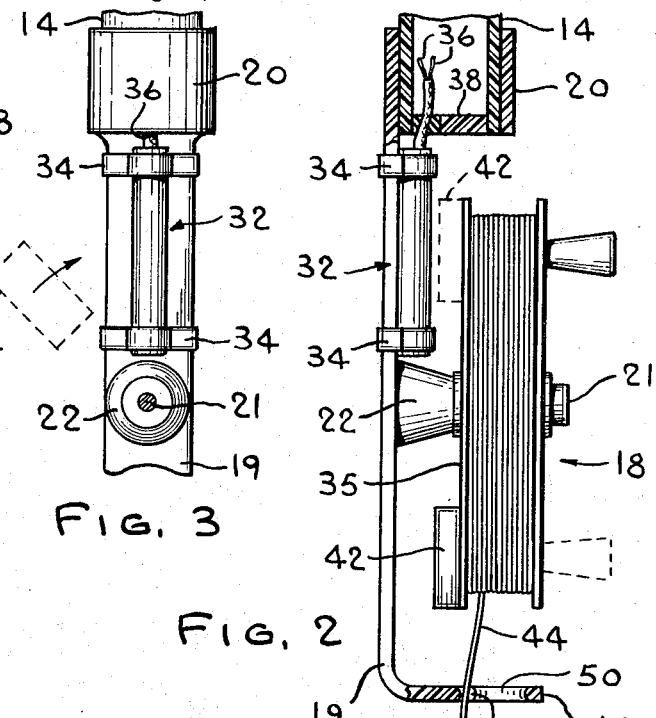
FIG. 3
FIG. 2
FIG. 4
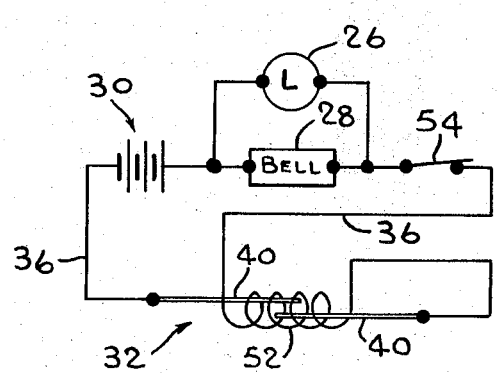
FIG. 5
INVENTOR
BENJAMIN C. ROEMER
BY John W. Michael
ATTORNEY

United States Patent Office 3,359,673
Patented Dec. 26, 1967

3,359,673
ICE FISHING TIP-UP WITH LIGHT AND BUZZER
Benjamin C. Roemer, Manitowish Waters, Wis. 54545
Filed Aug. 6, 1965, Ser. No. 477,790
11 Claims. (Cl. 43—17)

This invention pertains to improvements in ice fishing tip-ups and, particularly, to tip-ups of the type disclosed in my co-pending application Ser. No. 285,648, filed on June 5, 1963 and now Patent No. 3,213,561.

The principal object of the present invention is to improve the trigger and signal mechanisms of ice fishing tip-ups.

Prior to the present invention, the triggering mechanism was usually mechanically connected between the fishing reel and a spring-biased flag and maintained the flag in a depressed position until the reel was rotated, at which time the trigger mechanism was actuated to release the flag and permit it to be moved to an upstanding position by the spring.

The design of the tip-up disclosed in my co-pending application eliminated the mechanical connection between the reel and the flag by utilizing a magnetic coupling having one member attached to the reel and another member attached to the base structure of the flag. The magnetic coupling maintained the flag in the depressed position against the bias of the spring as long as the two magnetic coupling members were relatively close to each other. Upon reel rotation, the coupling member attached to the reel was, of course, rotated out of its position thereby reducing the magnetic force and, thus, permitting the spring to move the flag to an exposed position. This design permitted the flag and its spring actuating structure to be sealed at its lower end in a watertight tube and, thus, avoid contact with the water when the reel was positioned therein. This design also eliminated the moving mechanical trigger elements which had been found to be susceptible to freeze-up in earlier designs.

The present invention is a further improvement of the tip-up in that it contemplates the elimination of the mechanical trigger mechanism as well as the elimination of the mechanical visual signal means. The improvement is attained by substituting an electric bulb and an electric bell for the signal flag and by further providing an electric curcuit which will be closed in response to reel rotation to energize the bulb or bell until the tip-up has been tended to by the fisherman. The energization of the circuit is attained by a magnetically responsive normally open reed switch which is closed by a magnet, which is attached to the reel, moves past the switch during reel rotation, and which is thereafter maintained in a closed position by the magnetic field of a coil within the circuit which is energized by closing of the reed switch. A separate manual switch is provided to break this circuit and, thus, move the reed switch to its normally open position. This design has greatly reduced the number of parts and the assembly operation required in the manufacture of the tip-up and, in addition, provides a tip-up which will not be susceptible to freeze-up.

Other objects and advantages will be pointed out in, or be apparent from the description and claims, as will obvious modifications of the one embodiment shown in the drawings, in which:

FIG. 1 is a side view of the tip-up embodying the present invention, the tip-up being shown positioned in the fishing position over a hole cut in the ice, the ice being shown in cross section;

FIG. 2 is an enlarged side view of the reel in a position before a strike with part of its supporting structure being broken away from the sake of clarity and with the position of the reel at the time of switch actuation being indicated by broken lines;

FIG. 3 is a side view of the structure shown in FIG. 2 with the reel being deleted and with the magnet being shown in broken lines advancing towards a switch actuating position;

FIG. 4 is a top view of the line holding bracket; and

FIG. 5 is a diagram of the signaling circuit employed in this ice fishing tip-up.

Referring to the drawings in detail, the ice fishing tip-up 10 shown in FIG. 1 is positioned over a hole in ice 12. The tip-up is comprised of an elongated hollow tube 14 which is maintained over the hole by a tripod base 16 and which has a fishing reel 18 attached by a bracket 19 to the lower end of the pole. The bracket is attached to the tube by a collar 20 and is provided with a stub shaft 21 and a spacer 22 for mounting of the reel. Since it is important in ice fishing to maintain the reel below the water surface 23, the tube 14 is fixed for vertical adjustment in the collar 24 of the base. Electrical signal means, comprised of an electric bulb 26 and an electrical bell 28, is fixed to the top of the tube. The bulb and bell are connected by electrical wires to a dry cell battery 30 (FIG. 5) and to a reed switch 32 mounted by clips 34 on bracket 19 in close proximity to the inside face 35 of the reel 18. All electrical wires are located inside of the tube 14 except for two wires 36 extending through the sealed bottom cap 38 to connect the reed switch within the circuit. These two wires are sealed within the cap so that the inside of the tube can be maintained water free despite its immersion in water.

The reed switch 32 is of the well-known type having two contact blades 40 (FIG. 5) which are normally self biased in a switch-open position and which may be moved to a contacting switch-closed position by the magnetic force of an external magnet which is brought relatively close to the housing of the switch. When the magnet is removed, the blades of a reed switch will normally return to their normal switch-open position.

In order to energize the electrical signal means when a fish strikes, a permanent magnet 42 is mounted on the inside face 35 of the reel. When the tip-up is in the fishing position, i.e. prior to a strike, the reel assumes the position shown in FIGS. 1 and 2 with the magnet 42 being at the lower most position. Because of the weight of the magnet, this position is naturally assumed by the reel and, therefore, no pre-setting or adjusting is required when the tip-up is immersed in the water. At this time, the line 44 is pinched in a notch 46 on the inturned end 48 of the bracket and thus prevents reel rotation by the mere weight of the line.

When a fish strikes, the line is pulled out of the notch and passes freely through aperture 50 thereby causing the reel to rotate. After the first half-turn of the reel, the magnet is brought within sufficiently close proximity of the reed switch (shown in broken lines in FIG. 2) to cause the switch to close and, thus, energize the visual signal means.

Since the reed switch would normally open after the magnet has passed, the circuitry of the tip-up (FIG. 5) includes a coil 52 which is in series with the reed switch and which is wound around the switch in such a manner that the magnetic field created, as the switch is initially energized, will maintain the switch closed independently of the magnet. Thus, the electric signal means will be maintained energized until the fisherman has had a chance to tend to the tip-up, at which time he will open a toggle switch 54 which will open the tip-up circuit and, thus, cause the reed switch blades to assume their normal open-circuit position. However, it should be noted that the coil and toggle switch would not be necessary if a short blinking light were to be provided as the signal.

The housing of the reed switch is watertight and the coil may be wrapped around it externally; and thereafter, if desired, the assembly may be encapsuled to form a water resistant unit as shown in FIG. 5. If the electrical signal means is to include an electrical bulb as well as a bell, the two components have to be connected in parallel; otherwise, the bell would tend to interrupt the current supply to the coil and, thus, cause the reed switch to open prematurely.

Although but one embodiment of the present invention has been illustrated and described, it will be apparent to those skilled in the art that various changes and modifications may be made therein without departing from the spirit of the invention or from the scope of the appended claims.

I claim:
1. An ice fishing tip-up comprising:
   supporting means;
   rotatable fishing reel means supported by said supporting means;
   signal means connected to said supporting means and adapted to be electrically actuated to give a signal to a person tending the tip-up;
   a magnet connected to said reel means for rotation therewith;
   magnetically responsive switch means electrically connected to said signal means to actuate the same upon actuation of said switch means;
   said switch means being supported by said supporting means and being so located that said magnet will move, upon rotation of said reel means, from a position at which it is incapable of actuating said switch means to a position at which it is sufficiently close to actuate said switch means; and
   a source of electric power to actuate said signal means upon actuation of said switch means.

2. An ice fishing tip-up comprising:
   a base adapted to position the tip-up over a hole in ice;
   a supporting member connected to said base, said supporting member supporting a fishing reel and electrical signal means in such a manner that, when the tip-up is positioned over a hole in ice, said fishing reel is positioned below the ice and said signal means is positioned to give a signal to a person tending the tip-up;
   a reed switch having a watertight housing supported by said supporting member;
   a magnet supported by said reel for rotation therewith;
   said reed switch being in such a position in respect to said magnet that, at times when said reel is stationary and in a fishing position, said magnet is incapable of actuating said reed switch, but when said reel is rotated at the time of a strike, said magnet is moved by said reel sufficiently close to said reed switch housing to actuate said switch;
   a source of electrical energy; and
   electrical circuitry connecting said electrical signal means, said reed switch and said source of electrical energy to cause actuation of said electrical signal means upon actuation of said reed switch.

3. An ice fishing tip-up according to claim 2 wherein said signal means is comprised of a light bulb connected in series with said reed switch in said circuitry.

4. An ice fishing tip-up according to claim 2 wherein said signal means is comprised of a bell connected in series with said reed switch in said circuitry.

5. An ice fishing tip-up according to claim 2 wherein said signal means is comprised of a light bulb and an electrical bell connected in said circuitry parallel to each other and in series with said reed switch.

6. An ice fishing tip-up according to claim 2 including means to maintain said reed switch in said actuated position after said reed switch has been actuated by said magnet.

7. An ice fishing tip-up comprising:
   a base adapted to position the tip-up over a hole in ice;
   a supporting member connected to said base, said supporting member supporting a fishing reel and signal means which is electrically actuated to give a signal to a person tending the tip-up;
   a normally open switch which is closed in response to a magnetic force moved to a close position in respect to said switch, and is responsive to removal of such magnetic force to move to an open position, said switch being supported by said supporting member;
   a magnet supported by said reel for rotation therewith;
   a source of electrical energy;
   said switch being in such a position in respect to said magnet that, at times when said reel is stationary and in a fishing position, said magnet is incapable of providing sufficient magnetic force to move said switch to a closed position but, when said reel is rotated at times of a strike, said magnet is moved by said reel through a position sufficiently close to said switch to provide sufficient magnetic force to close said switch;
   electrical circuitry connecting said signal means, said switch and said source of electrical energy to cause actuation of said signal means upon actuation of said switch; and
   means to maintain said switch in said closed position after said magnet moves out of said sufficiently closed position.

8. An ice fishing tip-up according to claim 7 wherein said means to maintain said switch in said closed position is an electrical coil means connected in series with said switch and located so as to provide, upon closing of said switch, sufficient magnetic force to maintain said switch closed independently of the magnetic force of said magnet.

9. An ice fishing tip-up according to claim 8 wherein said signal means is comprised of an electrical bulb connected in series with said switch in said circuitry.

10. An ice fishing tip-up according to claim 9 wherein said signal means also includes an electrical bell connected in series with said switch.

11. An ice fishing tip-up according to claim 8 wherein said electrical circuitry also includes a second switch in series with the first mentioned switch, said second switch being operable to de-energize said coil means to thereby cause the first mentioned switch to return to its open position.

References Cited
UNITED STATES PATENTS

| | | | |
|---|---|---|---|
| 2,170,000 | 8/1939 | Eggleston | 43—17 |
| 2,657,494 | 11/1953 | Brundage | 43—17 |
| 2,741,054 | 4/1956 | Brundage | 43—17 |
| 2,986,835 | 6/1961 | Ordinetz et al. | 43—17 |
| 3,078,610 | 2/1963 | Howell | 43—17 |

SAMUEL KOREN, *Primary Examiner.*

WARNER H. CAMP, *Examiner.*